United States Patent [19]

Passimourt

[11] Patent Number: 4,780,292
[45] Date of Patent: Oct. 25, 1988

[54] PREPARATION OF COLORLESS N-(DICHLOROPHOSPHORYL)TRI-CHLOROPHOSPHAZENE

[75] Inventor: Nadine Passimourt, Pau, France
[73] Assignee: Atochem, Puteaux, France
[21] Appl. No.: 119,195
[22] Filed: Nov. 12, 1987

[30] Foreign Application Priority Data

Nov. 12, 1986 [FR] France ................................ 86 15684

[51] Int. Cl.$^4$ ............................................. C01B 25/10
[52] U.S. Cl. ..................................................... 423/300
[58] Field of Search ......................................... 423/300

[56] References Cited

U.S. PATENT DOCUMENTS

| 2,925,320 | 2/1960 | Kahler | 423/300 |
| 3,231,327 | 1/1966 | Seglin et al. | 423/300 |
| 4,377,558 | 3/1983 | De Jaeger et al. | 423/300 |
| 4,522,798 | 6/1985 | Lum et al. | 423/300 |
| 4,544,536 | 10/1985 | De Jaeger et al. | 423/300 |

FOREIGN PATENT DOCUMENTS

| 572951 | 3/1959 | Canada | 423/300 |
| 580958 | 8/1959 | Canada | 423/300 |
| 724556 | 12/1965 | Canada | 423/300 |
| 730618 | 3/1966 | Canada | 423/300 |
| 2117055 | 1/1973 | Fed. Rep. of Germany | 423/300 |
| 1321102 | 6/1973 | United Kingdom | 423/300 |

Primary Examiner—John Doll
Assistant Examiner—Wayne A. Langel
Attorney, Agent, or Firm—Burns, Doane, Swecker & Mathis

[57] ABSTRACT

Colorless, or but very faintly tinted N-(dichlorophosphoryl)trichlorophosphazene [$P_2NOCl_5$] is prepared by reacting phosphorus pentachloride with ammonium chloride in the presence of $POCl_3$, and then treating the resulting medium of reaction, containing $P_3NCl_{12}$, with $SO_2$, and wherein the temperature of the medium of reaction is maintained at a value of at most about 30° C.

8 Claims, No Drawings

PREPARATION OF COLORLESS N-(DICHLOROPHOSPHORYL)TRICHLOROPHOSPHAZENE

BACKGROUND OF THE INVENTION

1. Field of the Invention

The present invention relates to the preparation of N-(dichlorophosphoryl)trichlorophosphazene [$P_2NOCl_5$], and, more especially, to the preparation of N-(dichlorophosphoryl)trichlorophosphazene from phosphorus pentachloride and ammonium chloride.

2. Description of the Prior Art

The preparation of linear polychlorophosphazenes of the formula:

from N-(dichlorophosphoryl)trichlorophosphazene of the formula:

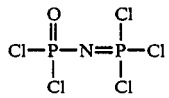

is known to this art (described in European Patent Application published under number 0,026,685).

This phosphazene of formula I may be produced by decomposition of $P_3NCl_{12}$ (structural formula [$Cl_3P=NPCl_3$]$^+PCl_6^-$) under the action of $P_2O_5$, with the $P_3NCL_{12}$) being prepared from phosphorus pentachloride and ammonium chloride (U.S. Pat. No. 3,231,327).

Such method requires the use of $P_2O_5$, a compound which is awkward to handle on account, in particular, of the solid state thereof and its hydrophilicity, and the decomposition of $P_3NCl_{12}$ is accompanied by the production of a large amount of $POCl_3$ (7 moles per 3 moles of compound of formula I).

The proposal has been made (M. Becke-Goering and W. Lehr., Chem. Ber., 94 1591-4 (1961)) to decompose $P_3NCl_{12}$ by means of $SO_2$. According to these authors, $P_3NCl_{12}$ is separated from the reaction medium and dissolved in liquid $SO_2$. This technique requires the use of a large amount of $SO_2$, and demands the prior separation of $P_3NCl_{12}$, an operation which must of necessity be carried out while shielded from atmospheric moisture. J. Emsley and P. B. Udy J. Chem. Soc., (A) 3025-9 (1970), propose carrying out the synthesis of $P_3NCl_{12}$ in symmetrical tetrachloroethane and injecting $SO_2$ into the reaction medium. This technique gives rise, during the stage of preparation of the $P_3NCl_{12}$, to the simultaneous formation of higher homologs ($P_3N_2Cl_9$ and $P_4N_2Cl_{14}$) as well as cyclic oligomers $(N=PCl_2)_n$ wherein n ranges from 3 to 7.

The treatment of a reaction medium of this type with $SO_2$ causes a highly exothermic reaction which raises the temperature of the medium to the boiling point of the solvent. The reaction mixture becomes intense yellow in color and, after removal of the solvent, the crude product is orange-yellow. Experience has shown that distillation does not permit a colorless final product to be produced.

SUMMARY OF THE INVENTION

Accordingly, a major object of the present invention is the provision of an improved process for the production of $P_2NOCl_5$ which permits the intermediate preparation of $P_3NCl_{12}$ containing only a very small proportion of higher homologs or cyclic oligomers.

Another object of this invention is the provision of an improved process for the production of a phosphazene of formula I that is virtually colorless as regards the crude product, and completely colorless after distillation.

Another object of this invention is the provision of an improved process for the production of a phosphazene of formula I enabling the preparation of polycondensates having a molecular weight greater than $5 \times 10^5$.

Briefly, the present invention features contacting phosphorus pentachloride with ammonium chloride in the presence of $POCl_3$, then treating the reaction medium containing $P_3NCl_{12}$ with $SO_2$, while maintaining said reaction medium at a temperature equal at most to approximately 30° C., and, finally, separating therefrom the phosphazene of formula I.

DETAILED DESCRIPTION OF THE PREFERRED EMBODIMENTS OF THE INVENTION

More particularly according to the present invention, the mole ratio $PCl_5/NH_4Cl$ corresponding to the stoichiometry of the reaction between these compounds is 3:1. It may be advantageous to use an excess of ammonium chloride, of up to 20%. The in situ formation of phosphorus pentachloride from $PCl_3$ and $Cl_2$ is of course within the ambit of this invention.

The phosphorus oxychloride ($POCl_3$) is used as a solvent for at least a part of the reagents. In general, the amount by weight of the $POCl_3$ employed ranges from 0.5 to 5 times the amount by weight of $PCl_5+NH_4Cl$, and more advantageously ranges from 0.8 to 2 times.

The $POCl_3$ most especially recommended for the production of a phosphazene of formula I contains only a very small proportion of higher homologs or cyclic oligomers. It is apparent that the combination of $POCl_3$ with other solvents that are known for this type of reaction, such as symmetrical tetrachloroethane or chlorobenzene, is also within the ambit of this invention.

Sulfur dioxide is used for the decomposition of the $P_3NCl_{12}$ to $P_2NOCl_5$. As a result, the amount of $SO_2$ employed must be such that the mole ratio ($SO_2/PCl_5$ introduced) is at least 2:3. It is possible to use a higher mole ratio, but it does not appear to be advantageous to exceed a mole ratio of 1.5:1.

The reaction of $PCl_5$ with $NH_4Cl$ is typically carried out in an inert atmosphere and at a temperature above 70 C. It is advantageous to operate at atmospheric pressure and at the refluxing temperature of $POCl_3$, the reaction medium being vigorously stirred. The reaction time is on the order of a few hours, for example 1 to 8 hours. When the reaction is complete (indicated, in particular, by the cessation of evolution of HCl), it is appropriate to adjust the temperature of the reaction medium down to a temperature equal at most to approximately 30.C.

It is appropriate to regard the value of 30.C as a recommended maximum value for producing colorless products but, taking into account the practical details of assessment of coloration (optical examination), this value may be slightly exceeded without departing from the scope of the invention.

Into the reaction medium consequently maintained at approximately 30° C. or at a lower temperature, the $SO_2$ is introduced. This introduction is carried out at such a rate that the temperature of the medium does not rise above 30° C. More generally, the treatment with $SO_2$ may be conducted at any temperature between the melting point of the reaction medium and at most 30° C.

The $SO_2$ is advantageously introduced gradually, over a period of time which can range from 0.5 to 10 hours, and preferably from one to 6 hours, it being possible to regard these values only as orders of magnitude.

The reactions of formation and decomposition of $P_3NCl_{12}$ and the possible excesses of reagents employed give rise to the presence of HCl and $SO_2$, which can be removed by simply bubbling nitrogen through the reactor, or conducting the reaction under reduced pressure, as well as in the presence of $POCl_3$ and $SOCl_2$ which are removed by evaporation under reduced pressure.

The process according to the invention results in the production of N-(dichlorophosphoryl)trichlorophosphazene of formula I in a yield that is greater than 80%. The treatment by means of $SO_2$ at a temperature of less than 30° C. gives a virtually colorless crude $P_2NOCl_5$ and an absolutely colorless distilled $P_2NOCl_5$, an increasingly intense yellow coloration appearing when the temperature of the treatment with $SO_2$ reaches and exceeds 30° C.

The phosphazene of formula I prepared according to this invention can be used to produce, by polycondensation, for example, under the conditions described in published European Patent Application No. 0,026,685, polychlorophosphazenes and substitution products thereof, in particular polyorganophosphazenes such as polyalkoxyphosphazenes, polyaryloxyphosphazenes or polyaminophosphazenes.

In order to further illustrate the present invention and the advantages thereof, the following specific examples are given, it being understood that same are intended only as illustrative and in nowise limitative.

EXAMPLE 1

The following materials were successively introduced into a reactor:
 (i) 2,400 g (11.5 moles) of $PCl_5$;
 (ii) 230 g (4.3 moles) of $NH_4Cl$; and
 (iii) 1,500 ml of $POCl_3$.

The mixture was brought to the refluxing temperature of the solvent and maintained, under stirring, at this temperature for 2 hours. The reaction mixture was converted into a suspension of $P_3NCl_{12}$.

The reaction mixture was cooled to between 10 and 20° C. and 600 g (9.36 moles) of $SO_2$ were injected into the medium over the course of 250 min, the temperature being maintained at below 20° C.

After the reaction was complete, the residual gases (HCl and $SO_2$) were removed with a stream of nitrogen, with $POCl_3$ and $SOCl_2$ being removed under reduced pressure at 1 torr (temperature: 20° C.).

The completely colorless reaction mixture contained 1017 g of crude $P_2NOCl_5$ (97% yield with respect to $PCl_5$).

The crude $P_2NOCl_5$ was distilled under the following conditions:
 Temperature of the heating fluid: 130° C.
 Temperature of the boiling vessel: 115° C.
 Head temperature: 87° C.
 Pressure (absolute): 0.5 torr The operation was performed with a reflux ratio of 5 during the first 5% of distillation and a reflux ratio of 1 until the $P_2NOCl_5$ vapor ceased to be evolved. The total distillate collected represented 85% of the mass introduced into the boiling vessel (82.6% yield with respect to initial $PCl_5$).

It was noted that the first fraction of 5% possessed a very pale yellow tint, the following 80% being absolutely colorless and remaining colorless after 2 weeks of storage under nitrogen.

EXAMPLE 2

The experiment of Example 1 was repeated, introducing 1,000 g of $SO_2$ over the course of 300 min into a reaction mixture maintained at between 10 and 20° C. With all other conditions being equal, moreover, there were collected 997 g of colorless crude $P_2NOCl_5$ and, after distillation, 810 g of $P_2NOCl_5$ which was absolutely colorless and remained so after 2 weeks of storage under nitrogen.

EXAMPLE 3

The experiment of Example 1 was repeated, introducing the $SO_2$ over the course of 300 min into a reaction medium maintained at 30° C (instead of 10°–20° C.).

992 g of crude $P_2NOCl_5$ having a very pale yellow coloration were collected.

After distillation under the conditions of Example 1, completely colorless $P_2NOCl_5$ was collected after a topping of 20%.

COMPARATIVE EXAMPLE 1

The experiment of Example 1 was repeated, introducing the $SO_2$ over the course of 165 min into the medium at the refluxing temperature of the $POCl_3$.

The reaction medium was tinted strongly yellow and 1,020 g of crude $P_2NOCl_5$ having a strong orange-yellow coloration were collected.

The crude $P_2NOCl_5$ was distilled under the conditions of Example 1. A bright yellow coloration was obtained in the first 6% of the distillate. This coloration disappeared only after distillation of 35% of the charge. The distillation was continued until the $P_2NOCl_5$ vapor had disappeared. The distillate between 35 and 85% exhibited a pale grey tint which became intense after 48 hours of storage under nitrogen.

COMPARATIVE EXAMPLE 2

The Comparative Example 1 was repeated, introducing the $SO_2$ over the course of 300 min. 987 g of crude $P_2NOCl_5$ having a strong orange-yellow coloration were obtained. The distillate between 20 and 85% showed the same grey tint as in Comparative Example 1.

EXAMPLE 4

The $P_2NOCl_5$ derived from the fraction of the distillate of Example 1 between 5 and 85% was polycondensed under the following conditions:

(a) 165 g of $P_2NOCl_5$ and 137 g of trichlorodiphenyl were introduced into a reactor under a nitrogen atmosphere and heated, under stirring, at 280° C. $POCl_3$ was removed over a period of time of approximately 150 min. The polycondensate was maintained under stirring and a sample was withdrawn after 26 hours (A) and another after 30 hours (B);

(b) The solution of polychlorophosphazenes in trichlorodiphenyl obtained above was diluted in benzene such as to provide a solution containing 10% by weight of polychlorophosphazene.

A solution of phenol (35.65 g) in diethylene glycol dimethyl ether (150 g) was prepared separately. This solution was dehydrated to a degree of humidity of less than 10 ppm. Sodium (8.33 g) was introduced into this solution and the mixture was heated under stirring for 2 hours at 120° C. When the sodium had disappeared, there were introduced, over the course of 2 hours, approximately 200 g of the benzene solution of polychloro-phosphazene. The mixture was permitted to react for 48 hours at 120° C. The reaction mixture was neutralized by adding HCl. The solvents were evaporated off under vacuum. The residue was taken up into solution in the minimum of tetrahydrofuran, filtered and precipitated in methanol. The precipitate was drained, washed with methanol and dried at 80 C. under reduced pressure at 1 torr.

The intrinsic viscosities of the polydiphenoxyphosphazenes obtained were as follows:
  (i) From the sample A: $[\eta]=75$ ml/g, equivalent to a weight-average molecular weight of 803,000
  (ii) From the sample B: $[\eta]=79.4$ ml/g, equivalent to a weight-average molecular weight of 870,000
(measurement performed at 30° C. in tetrahydrofuran).

While the invention has been described in terms of various preferred embodiments, the skilled artisan will appreciate that various modifications, substitutions, omissions, and changes may be made without departing from the spirit thereof. Accordingly, it is intenied that the scope of the present invention be limited solely by the scope of the following claims, including equivalents thereof.

What is claimed is:

1. A process for the preparation of N-(dichlorophosphoryl)trichlorophosphazene [$P_2NOCl_5$], comprising (i) reacting phosphorus pentachloride with ammonium chloride in the presence of $POCl_3$, (ii) next treating the resulting medium of reaction, containing $P_3NCl_{12}$, with $SO_2$, said medium of reaction being maintained at a temperature of at most about 30° C., and (iii) recovering the $P_2NOCl_5$ from said medium of reaction.

2. The process as defined by claim 1, wherein the mole ratio $PCl_5/NH_4Cl$ is about 3:1.

3. The process as defined by claim 1, wherein the $NH_4Cl$ is employed in an up to 20% stoichometric excess with respect to said $PCl_5$.

4. The process as defined by claim 1, wherein the amount of $POCl_3$ by weight constitutes from 0.5 to 5 times the amount by Weight of $PCl_5+NH_4Cl$.

5. The process as defined by claim 4, wherein the amount of $POCl_3$ by weight constitutes from 0.8 to 2 times the amount by weight of $PCl_5+NH_4Cl$.

6. The process as defined by claim 1, wherein the amount of $SO_2$ employed is such that the mole ratio $SO_2/PCl_5$ is at least 2:3.

7. The process as defined by claim 5, wherein the mole ratio $SO_2/PCl_5$ does ot exceed 1.5:1.

8. The process as defined by claim 1, wherein the temperature of the medium of reaction into which the $SO_2$ is introduced is maintained at a temperature from the melting point of the reaction medium to approximately 30° C.

* * * * *

UNITED STATES PATENT AND TRADEMARK OFFICE
CERTIFICATE OF CORRECTION

PATENT NO. : 4,780,292

DATED : October 25, 1988

INVENTOR(S) : Passimourt et al

It is certified that error appears in the above-identified patent and that said Letters Patent is hereby corrected as shown below:

On the title page Item (19) "Passimourt" should read -- Passimourt et al --.

In Item (75) add -- Philippe Potin, Billere, France --.

Signed and Sealed this

Sixth Day of June, 1989

Attest:

DONALD J. QUIGG

Attesting Officer

Commissioner of Patents and Trademarks